United States Patent [19]

Bricot et al.

[11] Patent Number: 4,607,356
[45] Date of Patent: Aug. 19, 1986

[54] OPTICAL HEAD IN A DEVICE FOR RECORDING AND READING A DATA CARRIER

[75] Inventors: Claude Bricot; Michel Chaboche; Patrick Volleau; Dominique Leterme; Jean-Pierre Le Merer, all of Paris, France

[73] Assignee: Thomson-CSF, Paris, France

[21] Appl. No.: 473,013

[22] Filed: Mar. 7, 1983

[30] Foreign Application Priority Data

Mar. 9, 1982 [FR] France .................................. 82 03938

[51] Int. Cl.⁴ .......................................... G11B 7/095
[52] U.S. Cl. ..................................... 369/44; 369/119; 369/118; 369/111; 369/46; 350/486
[58] Field of Search ................. 369/119, 118, 122, 44, 369/45, 111, 46; 250/202; 350/486, 632, 6.6, 445

[56] References Cited

U.S. PATENT DOCUMENTS

| | | | |
|---|---|---|---|
| 3,043,195 | 7/1962 | Moultrie | 350/445 |
| 3,532,416 | 10/1970 | Schmidt | 350/445 |
| 3,952,148 | 4/1976 | Laub | 369/44 |
| 4,100,576 | 7/1978 | Ditthardt | 369/44 |
| 4,138,663 | 2/1979 | Lehureau | 369/44 |
| 4,187,001 | 2/1980 | Redwitz | 350/445 |
| 4,399,529 | 8/1983 | Leterme | 369/122 |
| 4,423,496 | 12/1983 | Ophey | 369/46 |
| 4,460,252 | 7/1984 | Volleau | 350/486 |
| 4,542,492 | 9/1985 | Leterme | 369/46 |

FOREIGN PATENT DOCUMENTS

| | | | |
|---|---|---|---|
| 2630381 | 1/1977 | Fed. Rep. of Germany | 369/44 |
| 3131212 | 3/1982 | Fed. Rep. of Germany | 369/44 |
| 2178107 | 11/1973 | France | 369/44 |
| 2378329 | 8/1978 | France | 369/44 |
| 2493018 | 4/1982 | France | 369/44 |
| 8103449 | 2/1982 | Netherlands | 369/44 |

OTHER PUBLICATIONS

*University Physics*, ©1962 by Sears et al., pp. 766–771.

*Primary Examiner*—Alan Faber
*Attorney, Agent, or Firm*—Oblon, Fisher, Spivak, McClelland & Maier

[57] ABSTRACT

The optical head in the recording - reading device of a data carrier comprises a semiconductor laser source. A lens makes it possible to focus the beam from this source on to the data carrier via a reflecting or deviating mirror. According to the invention the rotation axis of this mirror is in the plane of the entrance pupil and of the focus of the focusing lens.

8 Claims, 8 Drawing Figures

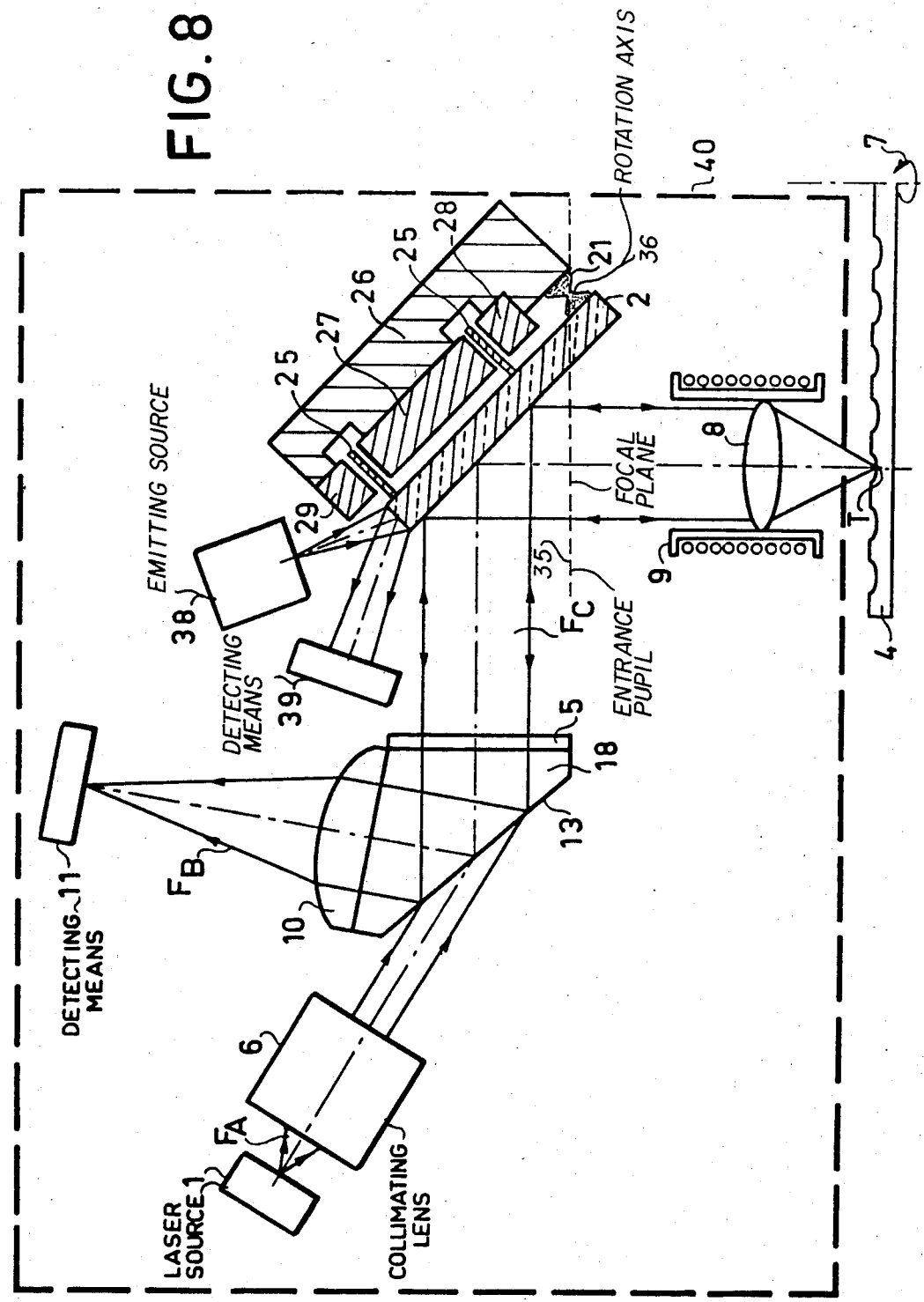

OPTICAL HEAD IN A DEVICE FOR RECORDING AND READING A DATA CARRIER

BACKGROUND OF THE INVENTION

The invention relates to the field of data carrier or medium disks, which can be optically recorded and read, the information being recorded in the form of a perturbation of a radiation-sensitive coating, e.g. a thermosensitive coating.

An optical head may comprise a GaAs semiconductor laser, a lens for setting to infinity, one or two anamorphic prisms, a polarization splitting or separating cube, a quarter-wave plate, a deviating or reflecting mirror and a system of servomotors for focusing on to the disk and for tracking purposes.

The light beam emitted by the laser source after reflection on the reflecting mirror is focused by the focusing lens on to a predetermined track of the data carrier. This reflecting mirror permits radial dependence on the optical head. However, due to the rotation of the reflecting mirror about its axis, this beam is subject to pupil effects. It is in fact diaphragmed by the entrance pupil of the focusing lens.

BRIEF SUMMARY OF THE INVENTION

The device according to the invention makes it possible to obviate this prior art disadvantage.

The present invention therefore specifically to an optical head in a recording-reading device for a data carrier having at least one track, together with a semiconductor laser source emitting a beam collimated in a given direction and illuminating via a reflecting mirror the entrance pupil of a lens projecting an illumination spot of said carrier, as well as means for the photodetection of the radiation collected by this lens from the data carrier, wherein the rotation axis of this reflecting mirror is located in the plane of the entrance pupil of the focusing lens.

BRIEF DESCRIPTION OF THE DRAWINGS

The invention is described in greater detail hereinafter relative to non-limitative embodiments and the attached drawings, wherein show:

FIG. 8 an optical head according to the invention.

DETAILED DESCRIPTION OF THE PREFERRED EMBODIMENTS

Figure 1:
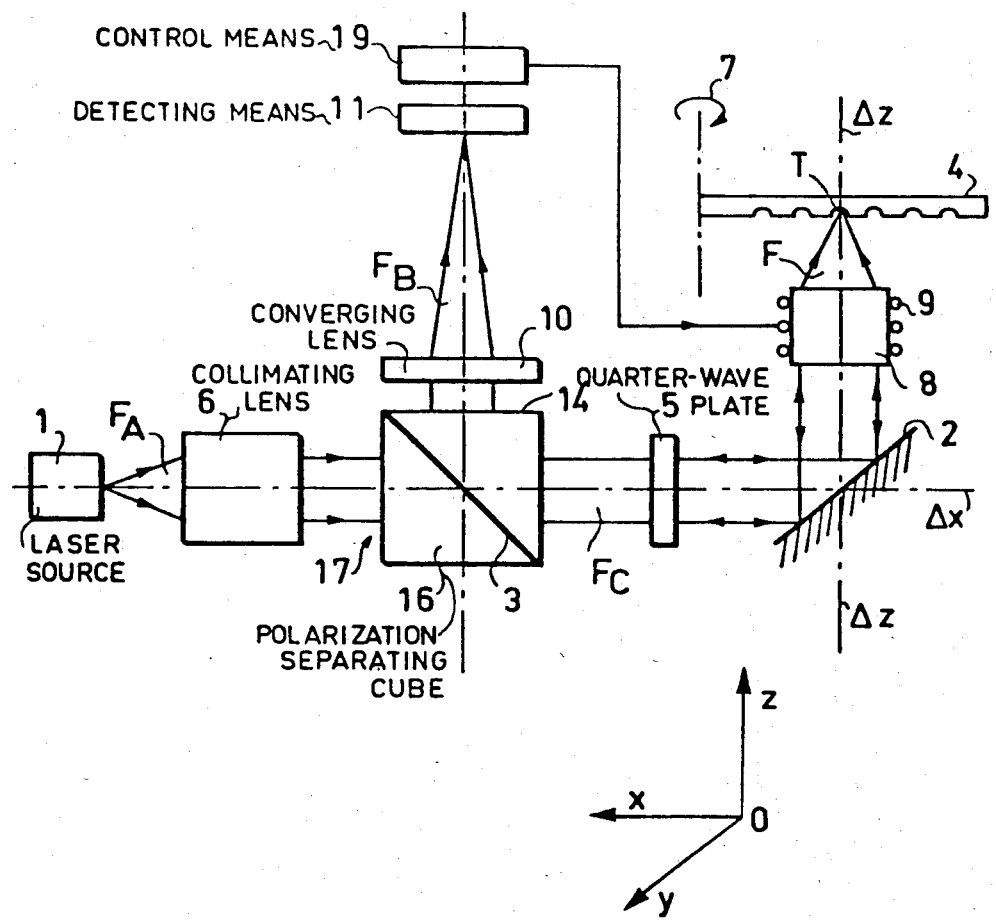
FIG. 1 the prior art device.

FIG. 1 shows a device according to the prior art in which the semiconductor laser is polarized in linear manner along the junction plane, which makes it possible to use a polarization beam splitter 16. The latter is in the form, for example, of a cube constituted by two bonded prisms. The splitting or separating surface 3 constituted by the hypotenuse of the two cubes is treated so as to have a polarization splitting action. It transmits all the radiation having a given polarization and reflects all the radiation having a polarization $\pi/2$ with respect to the first.

Thus, in FIG. 1, the radiation $F_A$ from the laser source is integrally transmitted towards disk 4. A lens 6, whose optical axis coincides with axis $\Delta_x$ is placed between laser 1 and the polarization beam splitter 16. On emission, the radiation is made roughly parallel, so that it totally reaches face 17 of beam splitter 16. This lens is designed so as not to have spherical aberrations for the maximum openings of the beam $F_A$ formed by laser 1.

Beam $F_C$ transmitted by this polarization splitter 16 then reaches the parallel quarter-wave plate 5, which is oriented by $\pi/4$ with respect to a polarization of the incident beam $F_C$.

This quarter-wave plate makes it possible to realize an optical decoupling. Thus, the radiation from source 1 and reflected by the surface of the data carrier 4 will no longer have the same polarity and will consequently have no interfering action.

Moreover, the linearly polarized incident wave leaves this parallel quarter-wave plate 5 polarized in a circular manner and e.g. in the levorotatory manner. This wave is transmitted to the elements of the recording-reading head and is reflected by the disk. It is then returned to the quarter-wave plate 5, still polarized in a circular manner, but in a dextrorotary direction. Thus, after traversing plate 5, this wave is returned to the beam splitter 16 polarized in linear manner, but at $\pi/2$ radians from the original polarization. Thus, reflection occurs on face 3 on traversing beam splitter 16.

Thus, the beam reflected by the surface of disk 4 of FIG. 1 is separated from the beam emitted by laser 1 due to quarter-wave plate 5 and to the separating surface 3 of the polarization splitting cube 16. When beam F is perfectly focused on the disk, forming a quasi-punctiform spot T, after traversing the convergent lens 10, which can e.g. be a planoconvex lens, the return beam $F_B$ is focused at a point. During the reading, the power of beam $F_B$, which can be detected in the vicinity of this point by detection means 11 is a function of the surface state of disk 4 at point T. The presence of an etched indentation implies an absence or reduction of the reflecting power of disk 4. Conversely, in the unetched areas, the beam is totally reflected. Thus, the power of beam $F_B$ is modulated during the rotation of the disk and the radial advance of the head, with the timing of the modulation of the relief previously inscribed on the disk. Moreover, both during recording and reading, it is desirable for the detection means 11 to be able to detect focusing errors (point T not precisely in the plane of the disk), expressed in the form of a displacement in Z. The detection signals of these errors are then used by means of circuit 19 for bringing about dependence of the position of lens 8. These detection means also make it possible to detect radial tracking errors (point T is not located on the etched track in the case of reading, or on the track which it is desired to make, generally materialized in the form of a pre-etched track in the case of recording), expressed in the form of a displacement on the radial axis of disk 4.

A galvanometer mirror 2 is positioned on the path of beam $F_C$ and its pivoting about an axis ensures the radial control. This deviating mirror 2 is inserted in front of lens 8, in order to deviate beam $F_C$ received in accordance with axis $\Delta x$ along an axis $\Delta z$. Lens 8 then focuses beam F on the data carrier disk 4, which performs a rotary movement symbolized by arrow 7.

Figure 2:
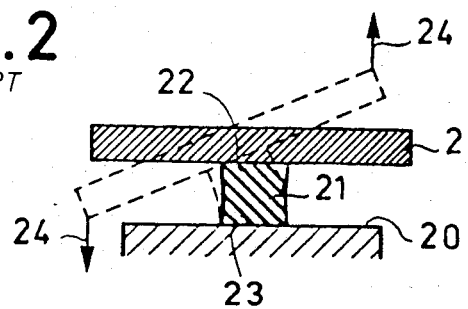
FIGS. 2 to 5 the operation of the reflecting or deviating mirror in the prior art devices.
Figure 3:
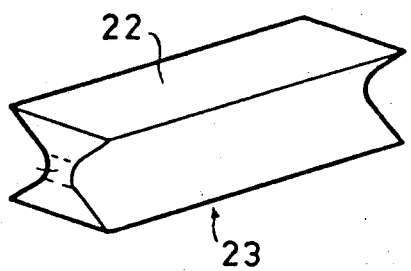
Figure 4:
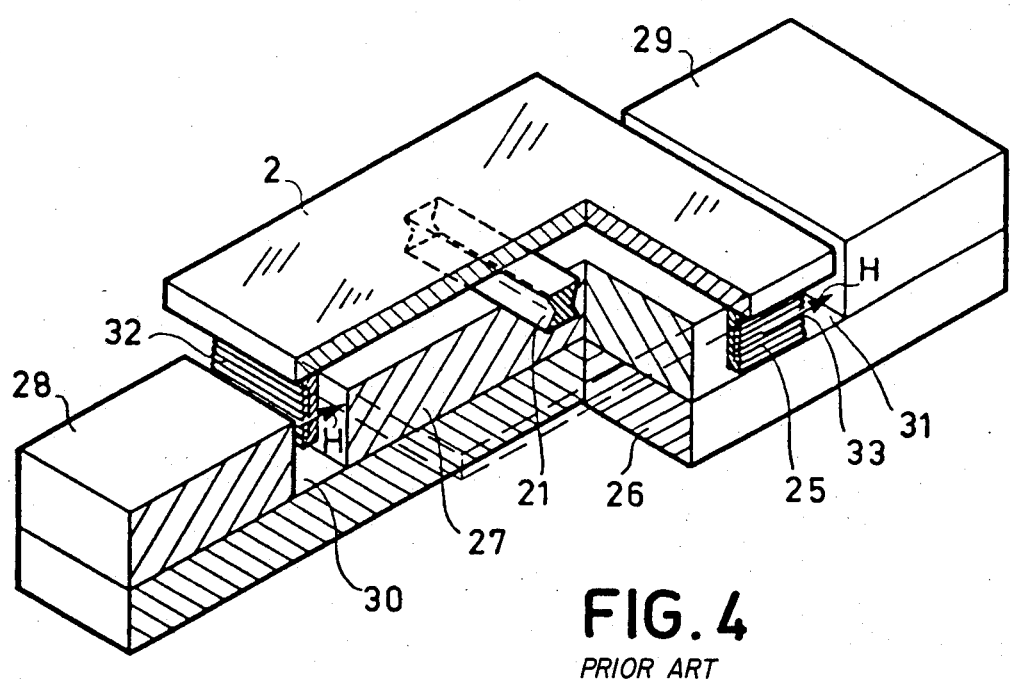

FIGS. 2, 3 and 4 illustrate a preferred embodiment of the reflecting or deviation mirror 2 used in the prior art devices and whereof certain elements are used in non-limitative manner in the present invention.

As is diagrammatically shown in sectional form in FIG. 2, the moving plane with which mirror 2 is integral and which, in the present embodiment, is the actual mirror resting on a plane 20 of the base fixed by means of an elastic prismatic element 21, whose axis is the direction about which pivots mirror 2. Element 21 is an e.g. rubber prism having two parallel, lateral, bearing faces 22, 23. Face 22 is bonded to the lower face of mirror 2 and face 23 is bonded to the plane 20 of the fixed base. Mirror 2 is arranged substantially symmetrically on element 21, so that it is in equilibrium parallel to plane 20 in the absence of electrodynamic forces.

The electrodynamic motor means equipping the deflector and which are not shown in the drawing produce on mirror 2 a force couple represented by arrows 24. Under the action of this couple, mirror 2 tilts in the manner shown in FIG. 2 leading to the bending of element 21 which remains attached thereto and which exercises on mirror 2 a restoring force tending to return it to its initial position.

In order to increase the definition of the rotary movement, it is possible to use an element 21 having a longitudinal constriction, parallel to the bearing faces under the action of the force couple which tilts the mirror. This element preferably deforms in the area of least mechanical resistance, i.e. in the constricted part. If it is sufficiently narrow, it can be likened to a rotation axis. An embodiment of such an element is shown in FIG. 3, in the form of an X-section prism. This prism has two parallel faces 22, 23, which are to be connected, e.g. by bonding, respectively to the mirror and to the fixed base plane. The cross-section of this prism is an X, whose constricted part arbitrarily defined by the dotted lines, constitutes the "axis" of the rotation section of the system.

An optical deflector using such an X-section element is shown in FIG. 4 and comprises a system of moving elements resting on a system of fixed elements by the X-section elastic element. A frame supporting coil 25 is bonded to the lower face of mirror 2. Mirror 2 is rectangular and the coil is a rectangular section frame having slightly larger dimensions than the mirror. The system of fixed elements comprises an actual base 26, on which are disposed three ferrite blocks 27, 28, 29, so as to provide two spaces 30, 31, parallel to two sides of the mirror and in which prevail two identical magnetic fields directed in accordance with arrows H. Mirror 2 is connected to the ferrite block 27 serving as a fixed plane by means of the prismatic rubber element 21, whose upper lateral face 22 is bonded to the lower face of mirror 2 and whose lower lateral face 23 is bonded to the upper ferrite face 27. Two opposite sides 32, 33 of coil 25 are introduced into spaces 30, 31 in which prevails the permanent magnetic field H. When the coil is energized by an electrical current I, the two opposite sides 32, 33 are subject to two forces of the same intensity, but opposite direction, so that mirror 2 pivots about the rotation "axis", constituted by the constriction of the elastic element 21. This element exerts a restoring force on the mirror, which is blocked in a position which is a function of the intensity of current I, which permits the remote control of the mirror orientation. In an application to the optical disk, such a deflector is used for the radial control of the optical beam and the track etched on the disk.

Figure 5:
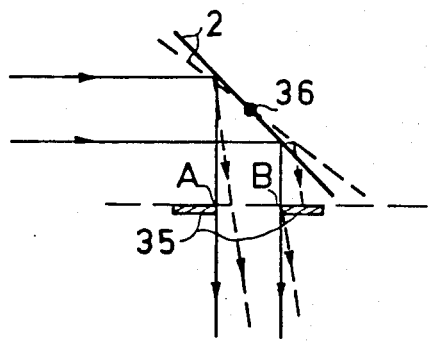

In the prior art devices, mirror 2 rotates about an axis 36, which is located in its centre of symmetry in the manner shown in FIG. 5. However, the incident beam shown in dotted line form is then diaphragmed by the entrance pupil 25 of the focusing beam.

In the optical head according to the invention the rotation axis 36 of the galvanometer mirror has been displaced in order to position it in the plane of the entrance pupil 35 of the focusing lens on the disk, in order to avoid pupil effects linked with the rotation of mirror 2 about its axis 36. And in order to avoid pupil effects at the time of beam return, this plane is also the objective focal plane. For reasons of convenience (avoidance of an excessively long lever arm which might disturb the system), the entrance pupil 35 of the focusing lens is as far as possible in front of the latter.

Figure 6:
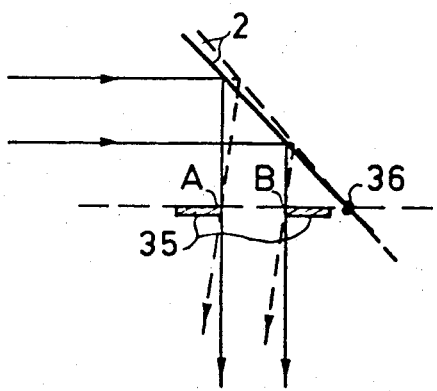
FIGS. 6 and 7 the operation of the mirror in the optical head according to the invention.

As shown in FIG. 6, when the reflecting or deviating mirror 2 rotates about its axis 36, the reflected beam has marginal raise which always pass through two points A and B, so that all its energy reaches disk 4. In the optical head according to the invention, the entrance pupil 35 is preferably considered as being a virtual pupil brought into the entrance space.

Figure 7:
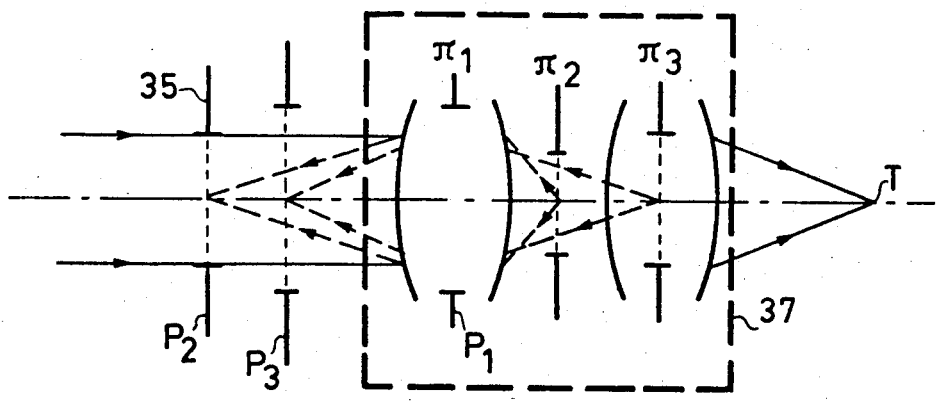

In FIG. 7 is used the non-limitative example of an optical device 37 having three elements, whose aperture diaphragms are respectively $\pi_1$, $\pi_2$ and $\pi_3$. $P_1$, $P_2$ and $P_3$ are the conjugates in the object space of these diaphragms $\pi_1$, $\pi_2$, and $\pi_3$. The incident beam on mirror 2 is collimated, so that $P_2$ which is the smallest aperture is the entrance pupil 35 and $\pi_2$ is the aperture diaphragm.

Consideration will now be given to the optical head according to the invention, comprising the reflecting mirror 2 and described hereinbefore and as is more particularly illustrated in a non-limitative manner in FIG. 4, whilst taking account of the modification illustrated in FIG. 6. This leads to an integrated optical head 40 according to the invention and as illustrated in FIG. 8. The elements described hereinbefore in FIGS. 1 and 4 are designated by the same reference numerals. The general operation of head 40 has been described relative to FIG. 1.

In the optical head according to the invention, the pivoting axis of the galvanometer mirror 2 does not coincide with the centre of gravity of the pivoting structure. Thus, during a rapid displacement of the optical head, the acceleration imparted to the mirror gives rise to a tilting moment, which disorients mirror 2. Mirror 2 can rotate about the axis materialized by the constricted section of the X-section support. The radial control is disturbed by the untimely pivoting, due to the acceleration occurring during a rapid displacement of the optical head.

In order to prevent this unbalance of mirror 2 during the rapid displacement of the optical head, an emitting source 38 which can e.g. be an emissive diode transmits a light beam which is reflected, e.g. on the section of the mirror made reflecting and then reaches photodetector means 39. The latter make it possible to lock mirror 2 in a given position during the rapid displacement of the optical head. These photodetector means can be realized e.g. with a two-quadrant cell. An emitting diode may be, also put on the mirror side near its rotation axis, facing a two-quadrant cell.

According to a preferred variant of the optical head according to the invention, the polarization splitter or separator is realized with a prism 18, which also permits the anamorphosis of the elliptical beam emitted by the laser source 1. This device is described in a U.S. patent application Ser. No. 468,684, filed on Feb. 22, 1983 and now U.S. Pat. No. 4,542,492.

The anamorphosis of the beam is obtained by inclining it relative to the normal of the entrance face of prizm 18, which is the base of an isosceles prism. Prism 18 is shown in FIG. 8, which illustrates the device according to the invention.

This prism then serves as a polarization beam splitter, so that its entrance face 13 has undergone a polarization splitting treatment, which completely transmits the incident light, whose polarization is oriented in accordance with the minor axis of the ellipse and completely reflects the light polarized by 90° which, after reflection, returns to the surface of disk 4.

Thus, prism 18 serves as the anamorphotic means. If m is the ellipticity of the beam (ratio of major axis on minor axis of ellipse), the angle A of this isosceles prism 18 is chosen as:

$$\sin A = \sqrt{\frac{1 - 1/m^2}{n^2 - 1/m^2}}$$

in which n is the index of the prism and i the angle of incidence of the beam with sin i = n sin A to pass out the beams in normal manner at the sides of the isosceles prism, both on the outward and return paths. For example, for m=2.56, we have at B an isosceles glass prism of index n=1.516 of angle A=39°9′ and with an incidence of 72°23′.

The quarter-wave plate 5 making it possible to rotate the polarization of the light reflected by the disk by 90° relative to that of the incident light, oriented in a square whose neutral lines are the diagonals, has been joined to one of the sides of prism 18.

Lens 10 can be in the form of a planoconvex lens which can e.g. be bonded to the other side of prism 18, in the manner shown in FIG. 8. This permits the focusing on the detection means 11.

What is claimed is:

1. An optical head for a data recording and reading device, said device including a data carrier having at least one data track and a laser source emitting a beam, said optical head comprising:
   a reflecting mirror mounted for rotation about a rotation axis for reflecting said beam;
   a lens having an entrance pupil lying in a plane and having a first and second focal plane, said data carrier lying in said first focal plane, said lens receiving said beam from said reflecting mirror through said entrance pupil to project an illumination spot on said data carrier and for collecting radiation from said data carrier; and
   photodetector means for receiving said radiation from said lens;
   said rotation axis lying in said entrance pupil plane and in said second focal plane.

2. An optical head according to claim 1, which also comprises means for locking the reflecting mirror.

3. An optical head according to claim 2, wherein the reflecting mirror locking means comprise a second light source which is reflected on the mirror to reach a second photodetector means.

4. An optical head according to claim 3, wherein the radiation emitted by the second light source is reflected on the face of the mirror so as to reach the second photodetector means.

5. An optical head according to claim 4, wherein said face of the mirror reflecting the radiation from the second light source is perpendicular to the face of the mirror reflecting said beam.

6. An optical head according to claim 1, wherein the reflecting mirror is integral with a rectangular coiled frame traversed by a variable electric current and which enters the fixed magnetic fields supplied by fixed inductor means constituted by three aligned parallelepipedic ferrite blocks in order to produce two air gaps traversed by two magnetic fields in the same direction, an elastic X-section element having two parallel bearing faces, one of the faces being fixed to one of the external parallelepipedic blocks, the other face being fixed to the back of the reflecting mirror, said element serving as a rotation axis for this mirror.

7. An optical head according to claim 1, wherein the data carrier is a disk.

8. An optical head according to claim 1, wherein said rotation axis is near one end of the reflecting mirror.

* * * * *